United States Patent Office 3,199,995
Patented Aug. 10, 1965

3,199,995
HYDRATION PREVENTION
Donald F. King, Pittsburgh, and George R. Henry, Bethel Park, Pa., assignors to Harbison-Walker Refractories Company, Pittsburgh, Pa., a corporation of Pennsylvania
No Drawing. Filed Apr. 10, 1963, Ser. No. 271,891
4 Claims. (Cl. 106—58)

This invention relates to promoting hydration resistance for size graded refractory specialty mixtures, which include a high proportion of high purity magnesia in the fine or —65 mesh fraction. In a particular embodiment, the invention relates to an improved bonding complex for unfired basic refractory specialties, which include a high percentage of high purity magnesia in the fines.

Magnesia is notoriously susceptible to hydration upon exposure to the atmosphere. It also has a tendency to cause bloating and swelling when used with an aqueous tempering media. This tendency to hydrate is particularly distressing to the refractories industry, which uses large quantities of magnesia in the manufacture of basic refractory specialties. It is even more pronounced with the high purity dead burned synthetic magnesia which is used today. By high purity, we mean containing at least about 90% MgO, by weight and on the basis of an oxide analysis, and preferably at least about 95%. By synthetic, we mean recovered from brines, bitterns, sea water, etc.

According, it is an object of this invention to provide an improved hydration preventing bonding system for size graded refractories which include a high percentage of finely divided high purity magnesia. Briefly, according to one aspect of the invention, a bonding system is provided for a size graded refractory batch. The bonding system is comprised of 0.25 to 5% flowers of very finely divided elemental sulfur, about 0.1 to 1.0% of sodium pyrophosphate having the formula $Na_4P_2O_7$, and about 1 to 5% of sodium silicate having an $Na_2O$ to $SiO_2$ weight ratio on the order of about 1 to 3.2 and analyzing about 23.2 $Na_2O$ and about 75.7 parts $SiO_2$. The sulfur is all less than 100 mesh and preferably all is less than 325 mesh. The sodium pyrophosphate is technical grade and substantially all —100 mesh. The sodium silicate is essentially —65 mesh. As 5% sulfur is appproached, fumes become noxious upon heating, although good hydration resistance is still apparent. At 0.1% sulfur, and even lower, some hydration resistance is provided. From 10 to 40% of the size graded refractory batch is —65 mesh dead burned magnesia of at least about 95% MgO content, and more than 50% of the —65 mesh magnesia passes a 325 mesh screen. The coarse +65 mesh fraction of the size graded batch may be comprised of almost any compatible refractory aggregate. Examples are calcined Alabama bauxite, calcined diaspore, kyanite, zircon, silicon carbide, Transvaal and Philippine chrome ore, olivine, and refractory aluminas, etc.

The following examples, which are given by way of explanation and not by way of limitation, more particularly point out the best modes now known to us for the practice of this invention. All parts and percentages are by weight, unless otherwise specifically stated. All chemical analyses are on the basis of an oxide analysis, in conformity with the conventional practices of reporting the chemical content of refractory materials. All analyses should be considered but typical. All size grading is according to the standard Tyler series.

*Example I*

A refractory batch mixture was prepared, which consisted essentially of a dead burned magnesite of about 94.8% MgO. The remainder of this magnesite was about 2.8% $SiO_2$, about 0.3% $Al_2O_3$, about 0.6% $Fe_2O_3$ and about 1.5% CaO. The batch sizing was substantially as follows: 40% 3½ on 8 mesh, about 27% —8+28 mesh, the remainder passing 28 mesh. Of that portion passing a 28 mesh screen, about 95% passed a 65 mesh screen. Of that portion passing the 65 mesh screen, 60% passed a 325 mesh screen. This —65 mesh fraction can be termed "super ball mill fines." To this batch we added 0.5% of finely divided elemental sulfur, 1% of sodium silicate having an $Na_2O$ content of about 23.5% and an $SiO_2$ content of 75.7% (all —65 mesh), and about .25% $Na_4P_2O_7$ (sodium pyrophosphate). We tempered this batch with about 6%, by weight, of water, based on the total dry solids in the batch. The batch had good flow and was easily cast. Shapes made from this batch were placed in an autoclave, and subjected to steam at a pressure of 80 p.s.i. for about one hour. The shapes were apparently unaffected. This established hydration resistance for the shapes.

An identical batch was prepared, in which no finely divided elemental sulfur was included; and in the steam autoclave at 80 p.s.i., the shape disintegrated. Another batch was prepared in which the —65 mesh fraction of the batch had less than 10% thereof passing a 325 mesh screen. In essence, this fraction would be termed "regular ball mill fines" in the industry. We added about 8% of water as a tempering agent. These shapes had satisfactory resistance to the high pressure steam hydration test. The shapes were not as strong as those using the super ball mill fines magnesia.

In still another test, we added about 1.5% of our finely divided flowers of elemental sulfur, 1% of highly alkaline sodium silicate analyzing about 27.5% $Na_2O$ and about 55% $SiO_2$ and 0.25% sodium pyrophosphate as a bonding complex. The magnesia sizing was the same as Example I, above. We used about 8% of water as a tempering agent. This batch gelled in the mixer.

The foregoing established that, for superior hydration resistance and good strength in the product, the following combination was necessary: ball mill fines content had to be controlled, and mixed with sulfur, less alkaline sodium silicate, and sodium pyrophosphate.

*Example II*

A good batch can consist of a dead burned magnesite analyzing 98% MgO, about 0.6% $SiO_2$, about 0.3% $Al_2O_3$, about 0.3% $Fe_2O_3$, about 0.6% CaO, the remainder being loss on ignition. The sizing of the batch is identical to Example I, above. A bonding complex of about 1% of our finely divided elemental sulfur and about 1.5% of sodium silicate having a soda:silica ratio of about 1 to 3.2, and about 0.2% of $Na_4P_2O_7$ is added to the batch. 7% water is used as the tempering agent.

Generally, no more than about 8%, by weight, of water can be added to the specialty refractories of this invention, with about 6 to 7% being considered optimum. Optimum results are obtained when the finely divided elemental sulfur addition is about 0.5%, when the sodium pyrophosphate addition is between 0.1 and 1%, and when the sodium silicate is about 2%, all parts by weight. We do not wish highly alkaline sodium silicates, since these appear to chemically react with the finely divided magnesia rather than act as the bonding ingredient we desire. Also, more alkaline silicates are not as stable in storage as might be desired. As a practical matter, the $Na_2O$ to $SiO_2$ ratio should be kept under about 1 to 3, i.e., no more alkaline.

Other materials which can be added as a dry solid and which are soluble in aqueous media, can be used besides the particular sodium phosphate, mentioned above. For example, sodium tetraphosphate, etc. Ammonia can be used, although it is not a "dry" material, nor is it solid. The amount of such other materials (which act as dispersants) is, of course, variable. As a general rule, however, only enough is added to assure uniform distribution of ingredients through a tempered batch with a minimum of tempering fluid.

Having thus described the invention in detail and with sufficient particularity as to enable those skilled in the art to practice it, what is desired to have protected by Letters Patent is set forth in the following claims:

We claim:

1. In a size graded refractory batch mixture of dry refractory particles in which 10 to 40% thereof is dead burned magnesite, the improvement which consists of the following to promote resistance to hydration and increased strength:
   (A) said batch including,
      (a) from 1 to 5% of a sodium silicate which is no more alkaline than one having one mole of $Na_2O$ and three moles of $SiO_2$,
      (b) from 0.1 to 5% of finely divided elemental sulfur,
      (c) a dispersant soluble in aqueous tempering media in a quantity sufficient to insure uniform distribution of ingredients through a tempered batch with a minimum of aqueous tempering fluid,
   (B) said 10 to 40% of magnesite being ball mill fines.

2. In a size graded refractory batch mixture of dry refractory particles in which 10 to 40% thereof is dead burned magnesite and the remainder is selected from the group which consists of calcined bauxite, calcined diaspore, kyanite, zircon, silicon carbide, Transvaal and Philippine chrome ore, olivine, refractory aluminas, and dead burned magnesite, the improvement which consists of the following to promote resistance to hydration and increased strength:
   (A) said batch including,
      (a) from 1 to 5% of a sodium silicate which is no more alkaline than one having one mole of $Na_2O$ and three moles of $SiO_2$,
      (b) from 0.1 to 5% of finely divided elemental sulfur,
      (c) a finely divided, dry dispersant soluble in aqueous tempering media in a quantity sufficient to insure uniform distribution of ingredients through a tempered batch with a minimum of of aqueous tempering fluid,
   (B) said 10 to 40% of magnesite being ball mill fines.

3. The batch mixtures of claim 1 containing:
   (A) about 2% of the sodium silicate,
   (B) about 0.5% of the sulfur,
   (C) about 0.1 to 1% of sodium pyrophosphate as the dispersant.

4. The batch mixtures of claim 1 in which the refractory particles are substantially all dead burned magnesia of at least about 95% MgO content.

References Cited by the Examiner

UNITED STATES PATENTS 2,947,649 8/60 Davies _____ 106—58
3,075,848 1/63 Davies et al. _____ 106—58

OTHER REFERENCES

Chemical and Metallurgical Engineering, volume 24, No. 2, 1921, pages 70 and 71.

TOBIAS E. LEVOW, *Primary Examiner.*